United States Patent
Jang et al.

(10) Patent No.: US 9,145,997 B2
(45) Date of Patent: Sep. 29, 2015

(54) MOLD FOR MAKING SOUND-ABSORBING DUCT AND SOUND-ABSORBING DUCT USING THE SAME

(71) Applicant: Hyundai Motor Company, Seoul (KR)

(72) Inventors: Young Hak Jang, Seoul (KR); Young Ho Han, Hwaseong-si (KR); Woomin Jung, Bucheon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/140,428

(22) Filed: Dec. 24, 2013

(65) Prior Publication Data
US 2015/0090525 A1    Apr. 2, 2015

(30) Foreign Application Priority Data
Sep. 27, 2013   (KR) .................. 10-2013-0115196

(51) Int. Cl.
*E04B 1/82* (2006.01)
*F16L 55/033* (2006.01)
*B29C 45/26* (2006.01)
*B29L 23/00* (2006.01)

(52) U.S. Cl.
CPC .............. *F16L 55/033* (2013.01); *B29C 45/26* (2013.01); *B29K 2821/00* (2013.01); *B29K 2905/00* (2013.01); *B29L 2023/00* (2013.01)

(58) Field of Classification Search
CPC ............ B29C 45/263; E04B 1/86; E04B 1/82
USPC ....................... 181/290; 123/184.53
See application file for complete search history.

(56) References Cited

U.S. PATENT DOCUMENTS

| | | | |
|---|---|---|---|
| 5,762,858 A * | 6/1998 | Maeda et al. ............... 264/516 |
| 6,517,595 B2 * | 2/2003 | Ishihara et al. ............ 55/385.3 |
| 8,882,490 B2 * | 11/2014 | Felker ........................... 425/542 |
| 2003/0062013 A1 * | 4/2003 | Kino et al. ............... 123/184.53 |
| 2009/0293832 A1 * | 12/2009 | Matsumoto et al. ..... 123/184.61 |
| 2010/0071991 A1 * | 3/2010 | Ono .............................. 181/229 |

FOREIGN PATENT DOCUMENTS

| | | |
|---|---|---|
| JP | 2010-48234 A | 3/2010 |
| KR | 2001-0076281 A | 8/2001 |
| KR | 10-2009-0015702 A | 2/2009 |
| KR | 10-1278528 B1 | 6/2013 |
| WO | WO 2013060489 A1 * | 5/2013 |

* cited by examiner

Primary Examiner — Forrest M Phillips
(74) Attorney, Agent, or Firm — Morgan, Lewis & Bockius LLP

(57) ABSTRACT

A mold for manufacturing a sound-absorbing duct, may include an inner mold made of an elastic material and having a channel therein, a sound-absorbing pad disposed outside the inner mold, and an outer mold disposed outside the sound-absorbing pad and having at least one first injection groove on an inner circumferential surface thereof.

7 Claims, 8 Drawing Sheets

MOLD FOR MAKING SOUND-ABSORBING DUCT AND SOUND-ABSORBING DUCT USING THE SAME

CROSS-REFERENCE TO RELATED APPLICATION

The present application claims priority to Korean Patent Application No. 10-2013-0115196 filed on Sep. 27, 2013, the entire contents of which is incorporated herein for all purposes by this reference.

BACKGROUND OF THE INVENTION

1. Field of the Invention

The present invention relates to a mold for manufacturing an sound-absorbing duct and a sound-absorbing duct using the same. More particularly, the present invention relates to a mold for manufacturing an sound-absorbing duct that can reduce noise generated in the process of sucking external air flowing into an engine, and an sound-absorbing duct using the mold.

2. Description of Related Art

In general, the engines of vehicles are equipped with an intake system for taking the air outside a vehicle to burn fuel.

FIG. 1 illustrates the configuration of a common intake system.

As shown in the figure, the intake system includes an sound-absorbing duct 10 having an inlet 11 through which external air flows inside and an air cleaner 20 purifying the air flowing inside through the inlet 11.

At least one resonator 31 and 33 is disposed on the sound-absorbing duct 10 to reduce noise that is generated by intake resistance generated due to inflow of the external air. Further, if necessary, a one-quarter wavelength pipe 35 is disposed to reduce noise at predetermined frequencies.

However, in order to make the sound-absorbing duct 10 of the intake system according to the related art, as shown in FIG. 2, the frame of a sound-absorbing duct is formed by a metal wire 13 and a plaited thread 14 and a twisted thread 15 are made outside and inside the metal wire 13, thereby completing an sound-absorbing duct.

Alternatively, as shown in FIG. 3, the frame of an sound-absorbing duct is formed by rolling a nylon wire 17 and a non-woven fabric band 19 and then the nylon wire 17 and the non-woven fabric band 19 are melted and fixed by hot melting.

However, according to this related art, it is impossible to manufacture a polygonal sound-absorbing duct due to reasons in the manufacturing process. That is, there is a problem in that it is possible to manufacture an sound-absorbing duct with a simple shape and impossible to manufacture an sound-absorbing duct with a complicated shape.

Further, there is a problem in that there are limitations in design because it is impossible to manufacture sound-absorbing ducts with various shapes according to the layout of vehicles.

Further, there is a problem in that it is required to use a material that is easy to manufacture, such that it is impossible to use a material with high sound absorption ability in manufacturing a sound-absorbing duct.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a mold for manufacturing an sound-absorbing duct having advantages of being able to manufacture a sound-absorbing duct in free shapes.

In an aspect of the present invention, a mold for manufacturing a sound-absorbing duct may may include an inner mold made of an elastic material and having a channel therein, a sound-absorbing pad disposed outside the inner mold, and an outer mold disposed outside the sound-absorbing pad and having at least one first injection groove on an inner circumferential surface thereof.

An air gate for gas inflow is formed at the inner mold.

The inner mold is made of silicon rubber, fluorine rubber, or AEM, or one of combinations thereof.

The sound-absorbing pad may include polypropylene fiber.

The outer mold is made of metal.

A guide mold made of metal is further disposed on an outer circumferential surface of the inner mold, wherein a second injection groove is formed on the outer circumferential surface of the guide mold.

The sound-absorbing duct according to an exemplary embodiment of the present invention may be made of any one of the molds described above.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
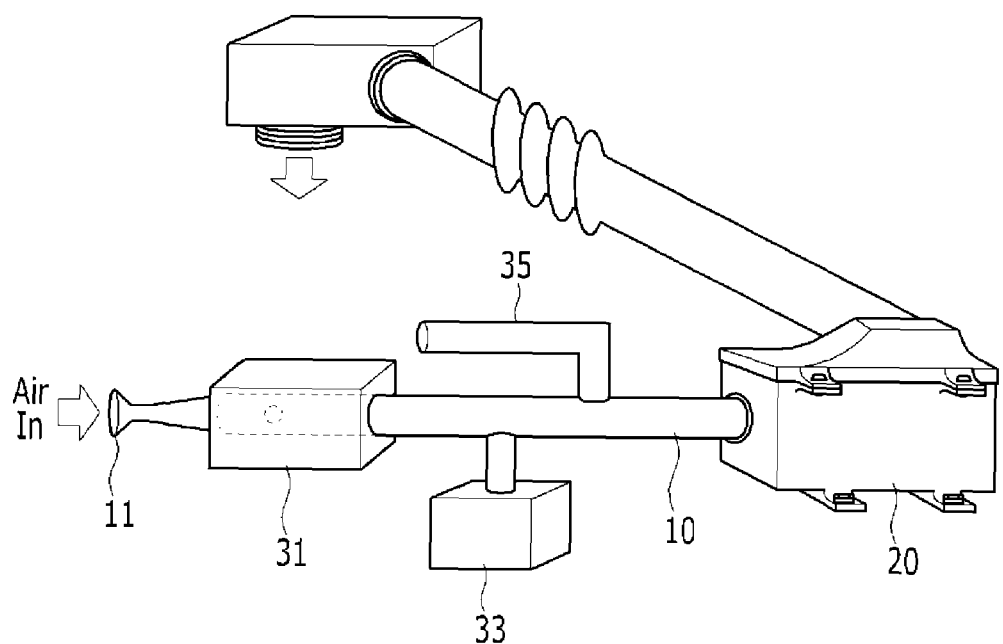
FIG. 1 is a schematic diagram illustrating the configuration of a common intake system.
Figure 2:
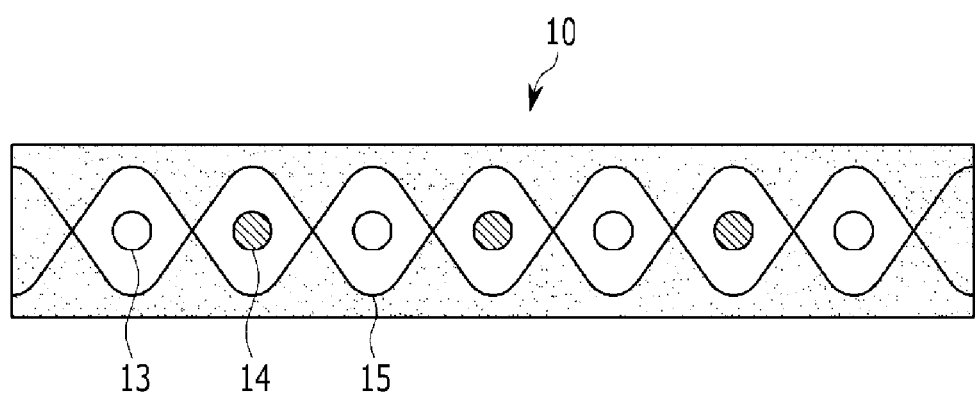
FIG. 2 is a schematic view illustrating a method of manufacturing a sound-absorbing duct according to the related art.
Figure 3:
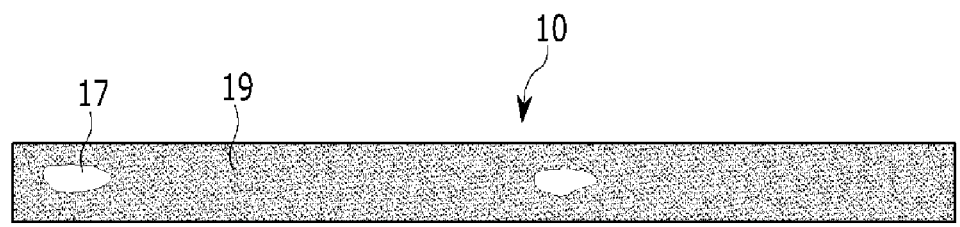
FIG. 3 is a schematic view illustrating another method of manufacturing a sound-absorbing duct according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The unrelated parts to the description of the exemplary embodiments are not shown to make the description clear and like reference numerals designate like element throughout the specification.

The sizes and thicknesses of the configurations shown in the drawings are provided selectively for the convenience of description, such that the present invention is not limited to those shown in the drawings and the thicknesses are exaggerated to make some parts and regions clear.

Figure 4:
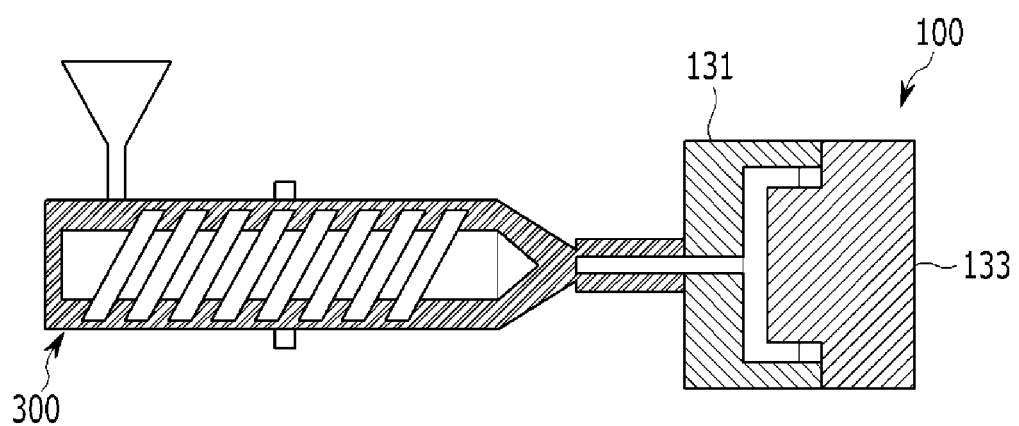
FIG. 4 is a schematic view illustrating the configuration of a molding apparatus for manufacturing a sound-absorbing duct according to an exemplary embodiment of the present invention.

FIG. 4 is a schematic view illustrating the configuration of a molding apparatus for manufacturing a sound-absorbing duct according to an exemplary embodiment of the present invention.

As shown in FIG. 4, a molding apparatus for manufacturing a sound-absorbing duct includes a mold 100 and a gas generator 300 putting air into the mold 100. The mold 100 includes an inner mold 110 and an outer mold 130 and the details are described below.

The gas generator 300 is used for keeping the shape of the inner mold 110 to be described below by supplying a high-pressure gas into the inner mold 110.

Figure 5:
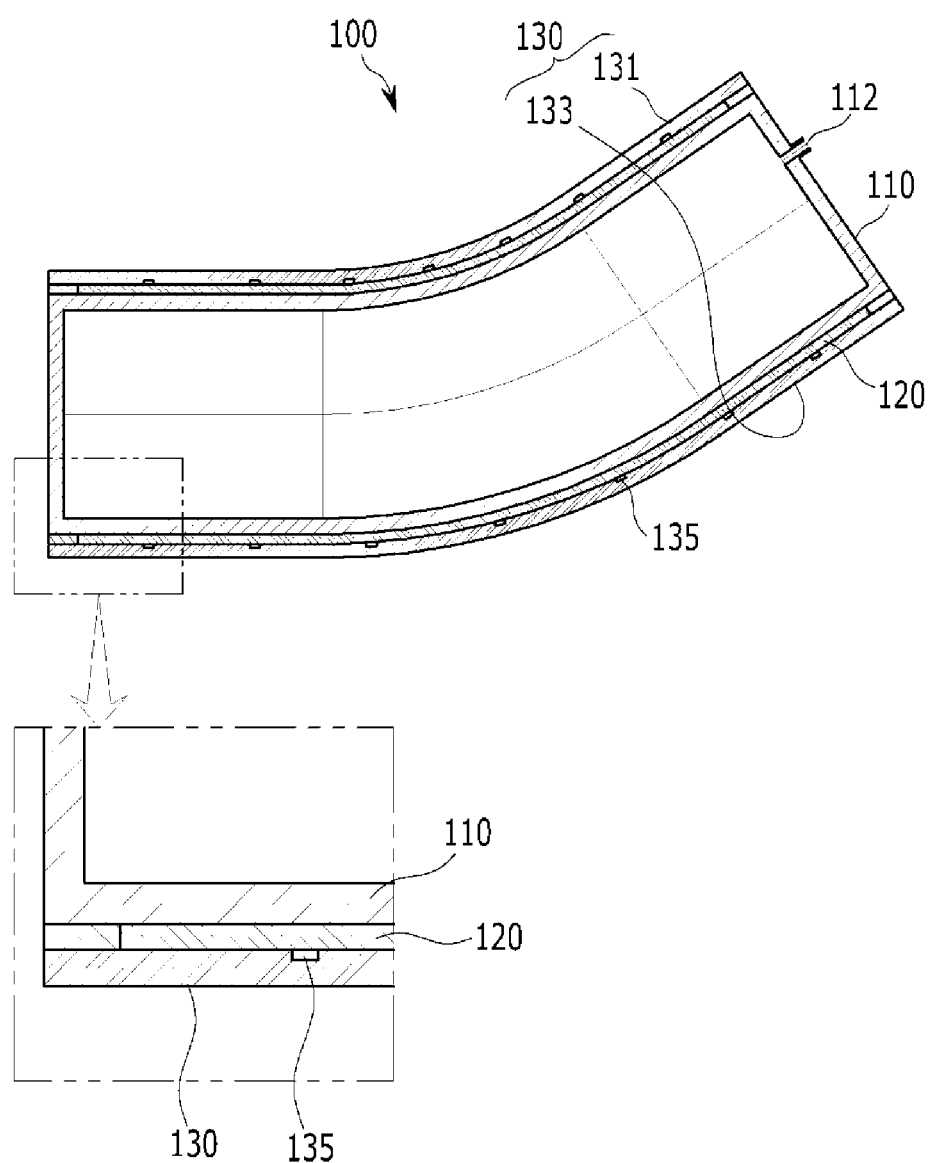
FIG. 5 is a schematic view illustrating the configuration of a mold for manufacturing a sound-absorbing duct according to an exemplary embodiment of the present invention.

FIG. 5 is a schematic view illustrating the configuration of a mold for manufacturing a sound-absorbing duct according to an exemplary embodiment of the present invention.

As shown in FIG. 5, a mold for manufacturing an sound-absorbing duct according to an exemplary embodiment of the present invention includes an inner mold 110 made of an elastic material and having a channel therein, a sound-absorbing pad 120 disposed outside the inner mold 110, and an outer mold 130 disposed outside the sound-absorbing pad 120 and having at least one first injection groove 135 on the inner circumferential surface.

The inner mold 110 is formed substantially in a cylindrical shape with a channel therein for external air to be able to flow. An air gate 112 is formed at the inner mold 110, such that a high-pressure gas produced by the gas generator 300 flows inside.

The inner mold 110 is made of silicon rubber, fluorine rubber, or AEM (Acrylic Ethylene Rubber), or one of combinations of them to be elastically deformable. The high-pressure gas produced by the gas generator 300 is put into the inner mold 110 through the air gate 112, such that the inner mold 110 can keep the shape.

The sound-absorbing pad 120 outside the inner mold 110 may include polypropylene fiber. In general, polypropylene fiber has higher sound absorption ability relatively to non-woven fabric used for the sound-absorbing pad 120 in the related art.

The outer mold 130 is made of metal such as steel and has an insertion space such that the inner mold 110 and the sound-absorbing pad 120 can be inserted. Further, the outer mold may be composed of two outer molds 130 and may be provided in order to separate a sound-absorbing duct from the outer mold 130 after manufacturing the inlet duce by injection molding. Since the sound-absorbing duct is generally formed in a cylindrical shape, it is preferable that the two outer molds 130 are formed in symmetric shapes. That is, the outer mold 130 includes a first outer mold 131 having an insertion space therein and a second outer mold 133.

A molding putted inside through a molding gate formed at the outer mold 130 is entangled with the sound-absorbing pad 120 in a first injection groove 135 formed on the outer mold 130, thereby forming a sound-absorbing duct.

Figure 6:
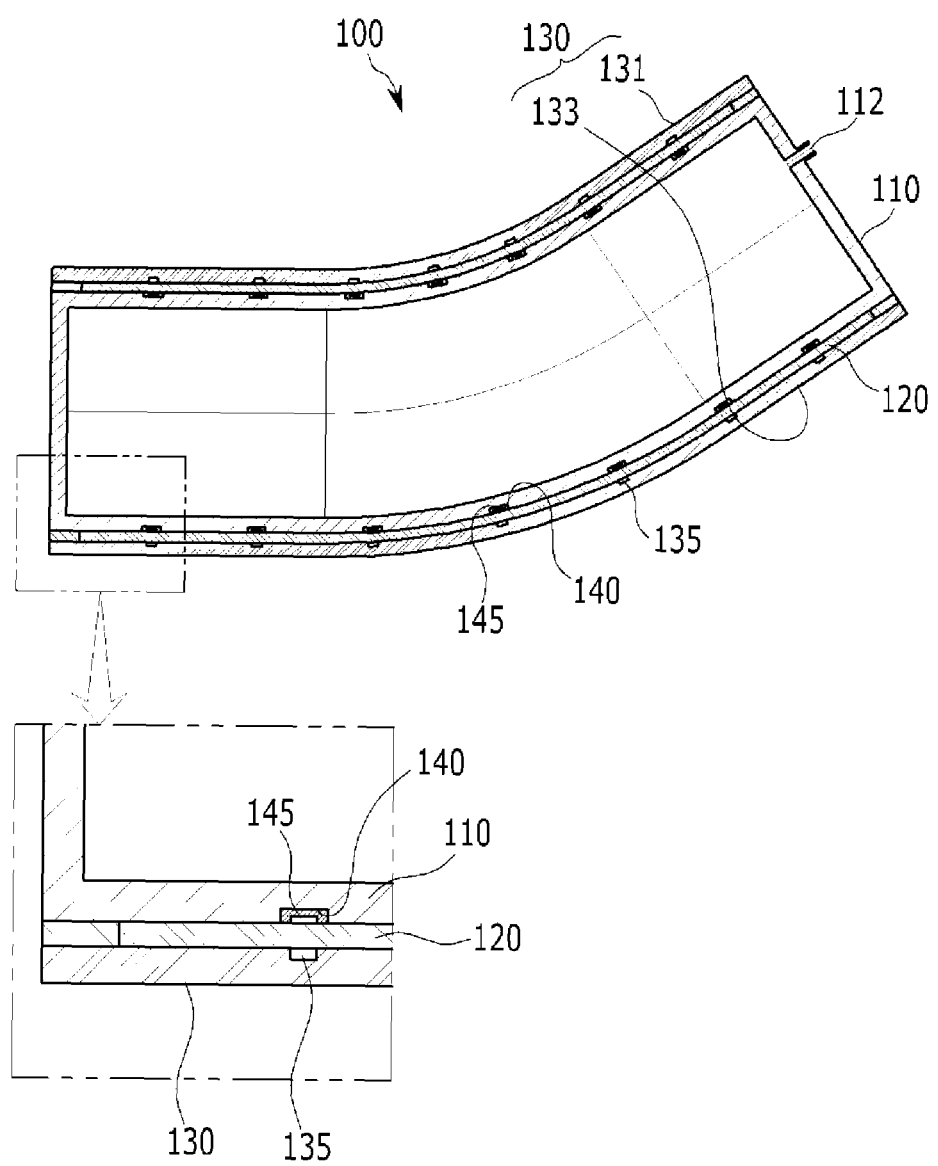
FIG. 6 is a schematic view illustrating the configuration of a mold for manufacturing a sound-absorbing duct according to another exemplary embodiment of the present invention.

FIG. 6 is a schematic view illustrating the configuration of a mold for manufacturing a sound-absorbing duct according to another exemplary embodiment of the present invention.

The mold for manufacturing a sound-absorbing duct shown in FIG. 6 has a configuration that is almost similar to that of the mold for manufacturing a sound-absorbing duct described with reference to FIG. 5. However, a guide mold 140 is further provided between the inner mold 110 and the sound-absorbing pad 120.

The guide mold 140 is made of metal and has a second injection groove 145 on the outer side. A molding putted inside through an injection gate formed at the outer mold 130 is entangled with the sound-absorbing pad 120 in the second injection groove 145, thereby forming a sound-absorbing duct. Accordingly, the frame of the sound-absorbing pad 120 can be stably formed.

A method of manufacturing a sound-absorbing duct, using the mold for manufacturing a sound-absorbing duct according to an exemplary embodiment of the present invention described with reference to FIG. 5 is described in detail.

First, a gas produced by the gas generator 300 is put inside through the air gate 112 of the inner mold 110 made of silicon rubber, fluorine rubber, or AEM to be deformable.

The inner mold 110 can make the shape of a sound-absorbing duct by the gas put in the inner mold 110.

The sound-absorbing pad 120 made of polypropylene fiber is wound around the inner mold 110.

The inner mold 110 with the sound-absorbing pad 120 wound thereon is seated in the insertion space of the first outer mold 131. Then, the first outer mold 131 and the second outer mold 133 are fixed.

Then, a molding is put inside through the molding gate of the outer mold 130. The molding is formed by mixing polypropylene with an organic filler. When the molding is put in the mold, the molding and the sound-absorbing pad 120 are entangled, thereby forming a sound-absorbing duct.

In general, the use temperature of silicon rubber or fluorine rubber which is used for the material of the inner mold 110 is 175° C. and the surface temperature of an injection mold is 60° C.-80° C., so the inner mold 110 is prevented from being damaged by the temperature of the molding.

Although the forming pressure of an injection mold is generally 100 bar, the pressure of the gas flowing into the inner mold 110 is maintained at 500 bar or more, such that deformation of the outer shape of the inner mold 110 due to the injection pressure is prevented.

The first outer mold 131 and the second outer mold 133 are separated, after the molding put inside hardens.

When the gas in the inner mold 110 is removed, the inner mold 110 contracts and can be separated from the outer mold 130. The sound-absorbing duct shown in FIG. 7 can be achieved by separating the absorbing-duct made of the molding after separating the inner mold 110 from the outer mold 130.

Figure 7:
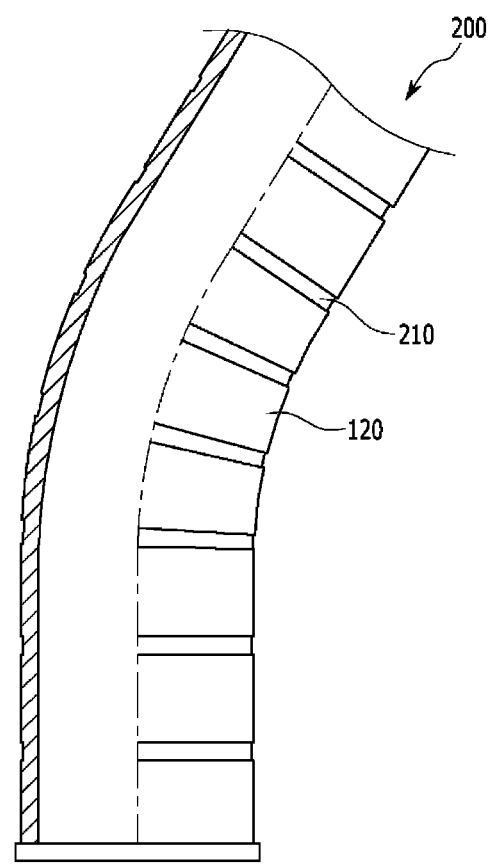
FIG. 7 is a schematic diagram illustrating the configuration of a sound-absorbing duct manufactured by a mold for manufacturing a sound-absorbing duct according to an exemplary embodiment of the present invention.

That is, as shown in FIG. 7, the sound-absorbing duct 200 is formed with the sound-absorbing pad 120, which is wound around the inner mold 110, entangled with the molding 210, which is formed outside the sound-absorbing pad 120.

A method of manufacturing a sound-absorbing duct, using the mold for manufacturing a sound-absorbing duct according to another exemplary embodiment of the present invention described with reference to FIG. 6 is described in detail.

First, a gas produced by the gas generator 300 is put inside through the air gate 112 of the inner mold 110 made of silicon rubber, fluorine rubber, or AEM to be deformable. The inner mold 110 can make the shape of an sound-absorbing duct by the gas put in the inner mold 110.

The guide mold 140 made of metal is seated outside the inner mold 110 and the sound-absorbing pad 120 made of polypropylene is wound around the inner mold 110 and the guide mold 140.

The inner mold 110 with the sound-absorbing pad 120 wound thereon is seated in the insertion space of the first outer mold 131. Then, the first outer mold 131 and the second outer mold 133 are fixed.

Then, a molding is put inside through the molding gate of the outer mold 130. The molding is formed by mixing polypropylene with an organic filler. When the molding is put in the mold, the molding and the sound-absorbing pad 120 are entangled, thereby forming a sound-absorbing duct.

In general, the use temperature of silicon rubber or fluorine rubber which is used for the material of the inner mold 110 is 175° C. and the surface temperature of an injection mold is 60° C.-80° C., so the inner mold 110 is prevented from being damaged by the temperature of the molding.

Although the forming pressure of an injection mold is generally 100 bar, the pressure of the gas flowing into the inner mold 110 is maintained at 500 bar or more, such that deformation of the outer shape of the inner mold 110 due to the injection pressure is prevented.

The first outer mold 131 and the second outer mold 133 are separated, after the molding put inside hardens.

When the gas in the inner mold 110 is removed, the inner mold 110 contracts and can be separated from the outer mold 130. The guide mold 140 is separated, after the inner mold 110 is separated from the outer mold 130.

Figure 8:
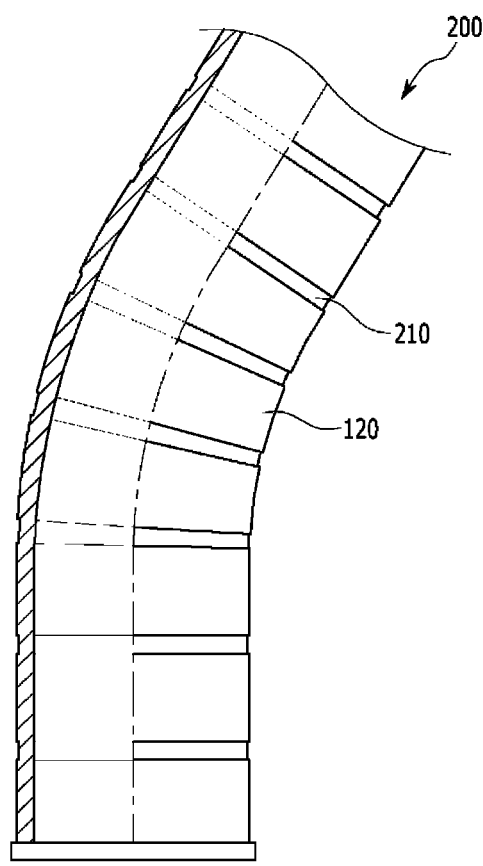
FIG. 8 is a schematic diagram illustrating the configuration of a sound-absorbing duct manufactured by a mold for manufacturing a sound-absorbing duct according to an exemplary embodiment of the present invention.

Finally, the sound-absorbing duct made of the molding is separated, and accordingly, the sound-absorbing duct shown in FIG. 8 can be achieved.

That is, as shown in FIG. 8, the sound-absorbing duct 200 is formed with the sound-absorbing pad 120, which is wound around the inner mold 110, entangled with the molding 210. Further, since the frame of the sound-absorbing duct 200 is formed by the molding 210 inside/outside the sound-absorbing pad 120, the shape of the sound-absorbing duct 200 can be stably kept.

According to the mold for manufacturing a sound-absorbing duct according to an exemplary embodiment of the present invention and the sound-absorbing duct using the mold, a sound-absorbing pad is provided outside an inner mold made of an elastic material and a molding put inside through an outer mold provided outside the sound-absorbing pad is formed with the sound-absorbing pad, such that a sound-absorbing duct that is free in shape can be manufactured.

Further, since a sound-absorbing duct that is free in shape can be manufactured, the degree of freedom in design is increased.

Further, since the sound-absorbing duct is manufactured by injection molding, a material having high sound absorption ability can be used, such that it is possible to reduce noise that is generated when external air flows inside.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A mold for manufacturing a sound-absorbing duct, comprising:
    an inner mold made of an elastic material and having a channel therein;
    a sound-absorbing pad disposed outside the inner mold; and
    an outer mold disposed outside the sound-absorbing pad and having at least one first injection groove on an inner circumferential surface thereof.

2. The mold of claim 1, wherein an air gate for gas inflow is formed at the inner mold.

3. The mold of claim 1, wherein the inner mold is made of silicon rubber, fluorine rubber, or AEM, or one of combinations thereof.

4. The mold of claim 1, wherein the sound-absorbing pad includes polypropylene fiber.

5. The mold of claim 1, wherein the outer mold is made of metal.

6. The mold of claim 1,
    wherein a guide mold made of metal is further disposed on an outer circumferential surface of the inner mold, and
    wherein a second injection groove is formed on the outer circumferential surface of the guide mold.

7. A sound-absorbing duct manufactured by the mold for manufacturing a sound-absorbing duct of claim 1.

* * * * *